(12) United States Patent
Veprinsky et al.

(10) Patent No.: US 12,314,393 B2
(45) Date of Patent: May 27, 2025

(54) DETECTION OF RANSOMWARE ATTACK USING ENTROPY VALUES

(71) Applicant: HEWLETT PACKARD ENTERPRISE DEVELOPMENT LP, Houston, TX (US)

(72) Inventors: Alex Veprinsky, San Jose, CA (US); Gil Barash, Ra'anana (IL); Oded Kedem, Ra'anana (IL)

(73) Assignee: Hewlett Packard Enterprise Development LP, Spring, TX (US)

( * ) Notice: Subject to any disclaimer, the term of this patent is extended or adjusted under 35 U.S.C. 154(b) by 200 days.

(21) Appl. No.: 18/051,110

(22) Filed: Oct. 31, 2022

(65) Prior Publication Data
US 2024/0143761 A1 May 2, 2024

(51) Int. Cl.
| | | |
|---|---|---|
| *G06F 21/56* | (2013.01) | |
| *G06F 17/18* | (2006.01) | |
| *G06F 21/55* | (2013.01) | |
| *G06F 21/62* | (2013.01) | |
| *H04L 9/40* | (2022.01) | |

(52) U.S. Cl.
CPC ............ *G06F 21/566* (2013.01); *G06F 17/18* (2013.01); *G06F 21/554* (2013.01); *G06F 21/56* (2013.01); *G06F 21/6218* (2013.01); *H04L 63/1425* (2013.01); *H04L 63/1441* (2013.01); *G06F 2221/033* (2013.01)

(58) Field of Classification Search
CPC ...... G06F 21/566; G06F 17/18; G06F 21/554; G06F 21/56; G06F 21/6218; G06F 2221/033; G06F 18/22; H04L 63/1425; H04L 63/1441; H04L 9/0643
See application file for complete search history.

(56) References Cited

U.S. PATENT DOCUMENTS

| | | | |
|---|---|---|---|
| 8,077,769 B2 | 12/2011 | Krishnan | |
| 11,023,327 B2 | 6/2021 | Linnen et al. | |
| 2017/0063907 A1* | 3/2017 | Muddu | ................ G06F 40/134 |
| 2019/0026466 A1* | 1/2019 | Krasser | .................... G06N 7/01 |
| 2019/0205530 A1* | 7/2019 | Brown | ................... G06F 21/566 |
| 2019/0294507 A1* | 9/2019 | Linnen | .................... G06F 17/18 |

(Continued)

OTHER PUBLICATIONS

C. E. Shannon, "A Mathematical Theory of Communication", The Bell System Technical Journal, vol. 27, 1948, 55 pages.

(Continued)

*Primary Examiner* — Cheng-Feng Huang
(74) *Attorney, Agent, or Firm* — Trop, Pruner & Hu, P.C.

(57) ABSTRACT

Example implementations relate to storing data in a storage system. An example includes accessing a first portion of a data stream to be stored in a storage system; selecting sample data blocks included in the first portion; determining entropy values based on the sample data blocks; selecting, based on the sample data blocks, a entropy threshold from multiple precalculated entropy thresholds; determining whether the generated set of entropy values matches the selected entropy threshold within a probability level; and in response to a determination that the generated set of entropy values matches the selected entropy threshold within the probability level, identifying the first portion of the data stream as potentially including encrypted data affected by a ransomware attack.

20 Claims, 7 Drawing Sheets

(56) References Cited

U.S. PATENT DOCUMENTS

2023/0306108 A1    9/2023  Veprinsky et al.
2023/0395193 A1*  12/2023  Krogan ................ G16B 20/50

OTHER PUBLICATIONS

Deng et al., "Self-Adaptive Image Thresholding within Nonextensive Entropy and the Variance of the Gray-Level Distribution", MDPI, Feb. 23, 2022, 21 pages.
Stack Overflow; "How to calculate the entropy of a file?", Jun. 13, 2009; 12 pages.
Wu et al., "Local Shannon entropy measure with statistical tests for image randomness", Elsevier Inc., 2012, 20 pages.

* cited by examiner

DETECTION OF RANSOMWARE ATTACK USING ENTROPY VALUES

BACKGROUND

A computing system may store data in one or more storage devices. Such stored data may be vulnerable to malware or other malicious attacks. For example, one type of malware is ransomware, which encrypts user data stored on a computing system and then holds the encrypted user data for ransom. If a user does not pay the ransom, the user data remain encrypted and may be impossible for the user to access.

BRIEF DESCRIPTION OF THE DRAWINGS

Some implementations are described with respect to the following figures.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In some examples, computing systems may store user data in one or more storage devices. Such computing systems may be vulnerable to a ransomware attack, which encrypts the stored user data. If a user does not pay a ransom, the user data may remain encrypted and may be impossible for the user to access. Further, if the ransomware is not detected soon enough, the encrypted user data may be replicated into backup copies of the user data. As such, creating backup copies may not prevent the loss of access to the user data caused by ransomware.

In some examples, encrypted data has a relatively high level of randomness (e.g., in comparison to non-encrypted data). For example, a ransomware attack may be detected by measuring an entropy level of the data, and determining that the measured entropy exceeds a threshold entropy level corresponding to substantially random data. However, the threshold entropy level may vary according to the number of distinct symbols (also referred to herein as "cardinality") that are included in the sampled data. Further, because the encrypted data (produced by the ransomware) cannot be assumed to use a specific cardinality, it may be difficult or impossible to determine the appropriate threshold entropy level. For example, if it is assumed that the encrypted data includes 256 distinct symbols (e.g., using 8 bits), the threshold entropy level may be selected to correspond to the randomness expected with a cardinality of 256. However, if the ransomware converts the binary encrypted data into a common base64 encoding (e.g., with every set of 3 bytes converted into a set of four 6-bit ASCII characters), the resulting encrypted data may resemble typical written text, and may therefore not appear to be random when using the threshold entropy level for the assumed cardinality of 256. As such, the ransomware may evade detection in this example.

In accordance with some implementations of the present disclosure, a computing system may perform sampling of data entropy characteristics to detect the presence of ransomware. The computing system may capture a portion of data being transmitted to a storage device. The computing system may select sample data blocks from the data portion, and may generate an entropy value for each sample data block. Further, the computing system may select one of multiple precalculated entropy thresholds based on the sample blocks, and may determine whether the generated entropy values match the selected entropy threshold within a probability level. If so, the computing system may identify the portion of the data stream as potentially including encrypted data caused by ransomware. In this manner, the computing system may improve the performance and accuracy of ransomware detection.

As used herein, a "storage system" can include a storage device or an array of storage devices. A storage system may also include storage controller(s) that manage(s) access of the storage device(s). A "data unit" can refer to any portion of data that can be separately identified in the storage system. In some cases, a data unit can refer to a chunk, a collection of chunks, or any other portion of data. In some examples, a storage system may store data units in persistent storage. Persistent storage can be implemented using one or more of persistent (e.g., nonvolatile) storage device(s), such as disk-based storage device(s) (e.g., hard disk drive(s) (HDDs)), solid state device(s) (SSDs) such as flash storage device(s), or the like, or a combination thereof.

As used herein, a "controller" can refer to a hardware processing circuit, which can include any or some combination of a microprocessor, a core of a multi-core microprocessor, a microcontroller, a programmable integrated circuit, a programmable gate array, a digital signal processor, or another hardware processing circuit. Alternatively, a "controller" can refer to a combination of a hardware processing circuit and machine-readable instructions (software and/or firmware) executable on the hardware processing circuit.

Figure 1:
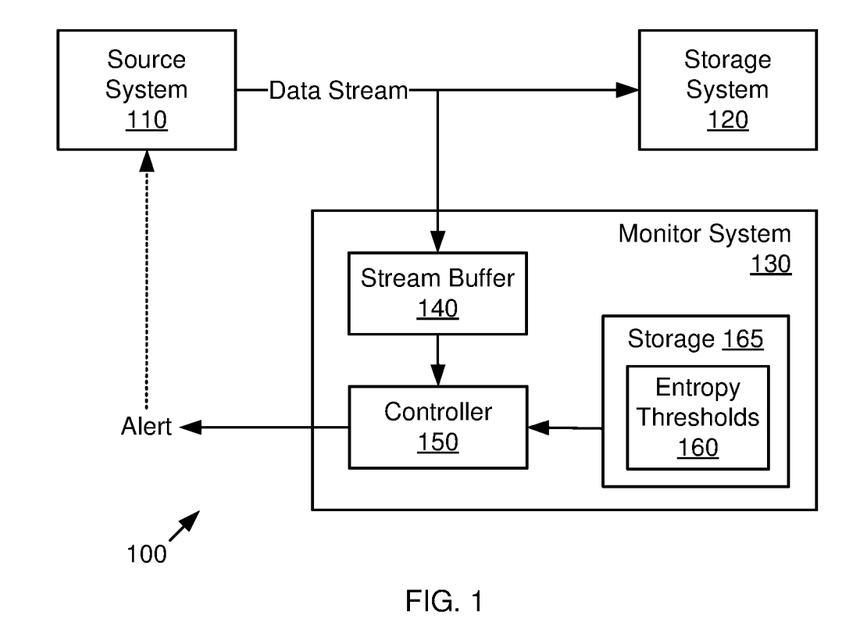
FIG. 1 is a schematic diagram of an example computing system, in accordance with some implementations.

FIG. 1—Example System

FIG. 1 shows an example system 100 in accordance with some implementations. As shown, the example system 100 may include a source system 110, a storage system 120, and a monitor system 130. The source system 110 may transmit a data stream to be stored on the storage system 120. For example, the source system 110 may be a physical computing device (e.g., server, appliance, desktop, etc.), a virtual computing device (e.g., virtual machine, container, etc.), and so forth. Further, the storage system 120 may be local storage device, a storage appliance, a storage array, remote storage service, and so forth. In some implementations, the source system 110 and the storage system 120 may be implemented in different devices and/or locations. However, in other implementations, the source system 110 and the storage system 120 may be implemented in a single device and/or system (e.g., a server, a server rack, and so forth).

In some implementations, the storage system 120 may store data in deduplicated form. For example, the storage system 120 may perform deduplication operations including comparing fingerprints of the incoming data units to fingerprints of the stored data units. As used herein, the term "fingerprint" refers to a value derived by applying a function on the content of the data unit (where the "content" can include the entirety or a subset of the content of the data unit). An example of the function that can be applied includes a hash function that produces a hash value based on the incoming data unit. Examples of hash functions include cryptographic hash functions such as the Secure Hash Algorithm 2 (SHA-2) hash functions, e.g., SHA-224, SHA-256, SHA-384, etc. In other examples, other types of hash functions or other types of fingerprint functions may be employed.

In some implementations, the monitor system 130 may include a stream buffer 140, a controller 150, and a storage device 165. The controller 150 may be implemented as a processor executing instructions (e.g., software and/or firmware) that are stored in a machine-readable storage medium, in hardware (e.g., circuitry), and so forth. The storage device 165 may be implemented using non-transitory storage media (e.g., hard disk drives, solid state drives), semiconductor memory (e.g., random access memory), and so forth. The storage device 165 may store multiple precalculated entropy thresholds 160 (discussed below). In some implementations, the stream buffer 140 may capture a recent portion of the data stream that is transmitted to be stored in the storage system 120. For example, the stream buffer 140 may continually capture and store a sliding window portion of the most recent data stream transmitted to the storage system 120.

In some implementations, the controller 150 may detect a trigger event (e.g., a timer, a user command, an interrupt, a schedule event, a program condition, and so forth), and in response may initiate a monitoring process to determine whether the source system 110 is under a ransomware attack. For example, the controller 150 may read or otherwise access the data portion that is currently stored in the stream buffer 140, and may select sample data blocks from the data portion (e.g., based on random selection). The controller 150 may generate an entropy value for each sample data block, and may identify symbols encoded in the sample data blocks. Further, the controller 150 may select one of multiple precalculated entropy thresholds 160 based on the identified symbols of the sample data blocks, and may determine whether the generated entropy values match the selected entropy threshold 160 within a probability threshold (e.g., is similar within a 95% probability). If so, the controller 150 may generate an alert notification ("Alert") to indicate that the data portion (included in the stream buffer 140) may have been encrypted by a ransomware attack (e.g., at the source system 110).

In some implementations, the alert notification may be provided to the source system 110, and a response to the potential ransomware attack may be initiated. For example, the source system 110 may be locked or shut down, a network connection may be disconnected, defensive programs may be activated, a data recovery process may be initiated, and so forth.

Figure 2:
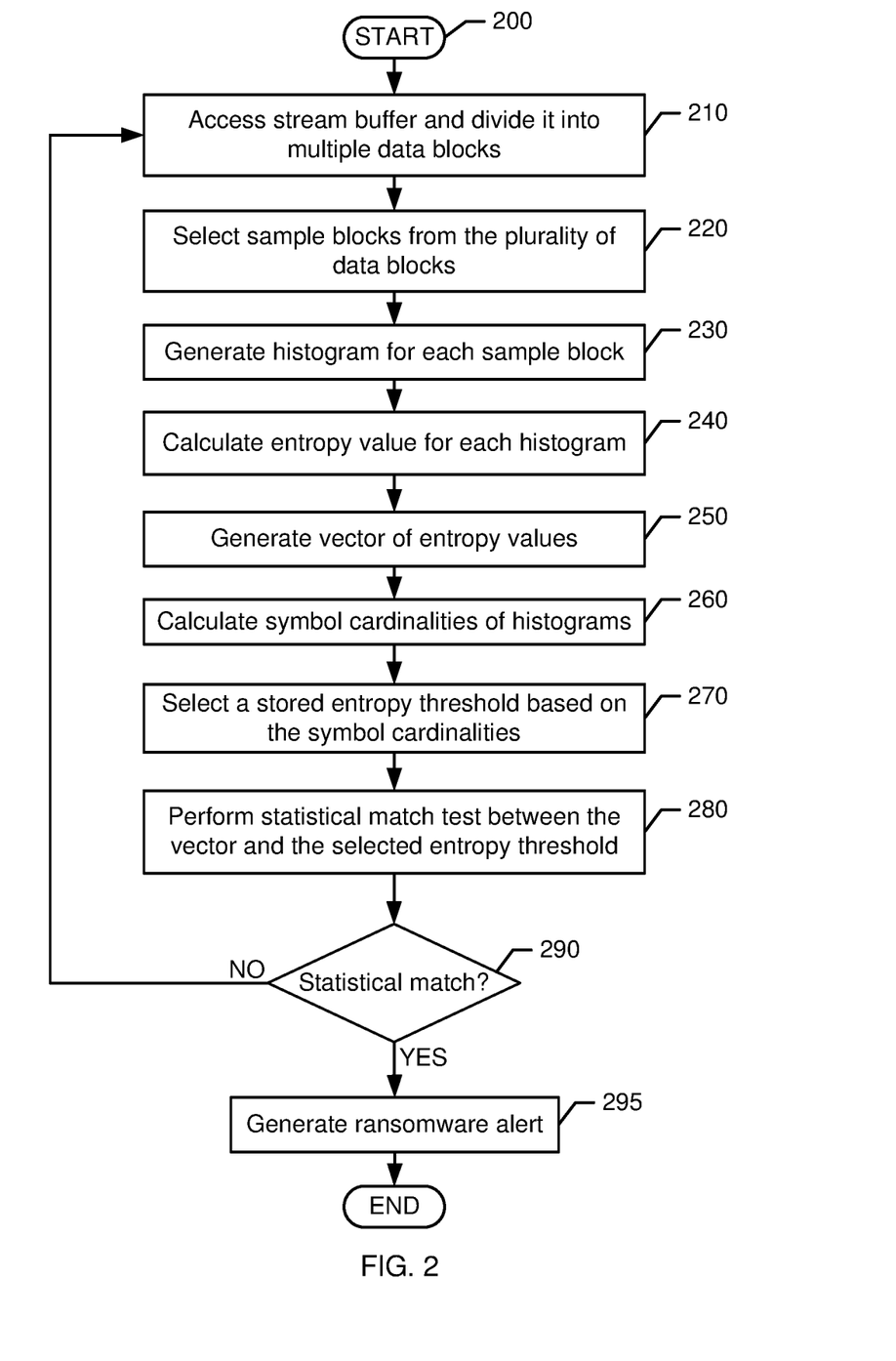
FIG. 2 is an illustration of an example process, in accordance with some implementations.
Figure 3:
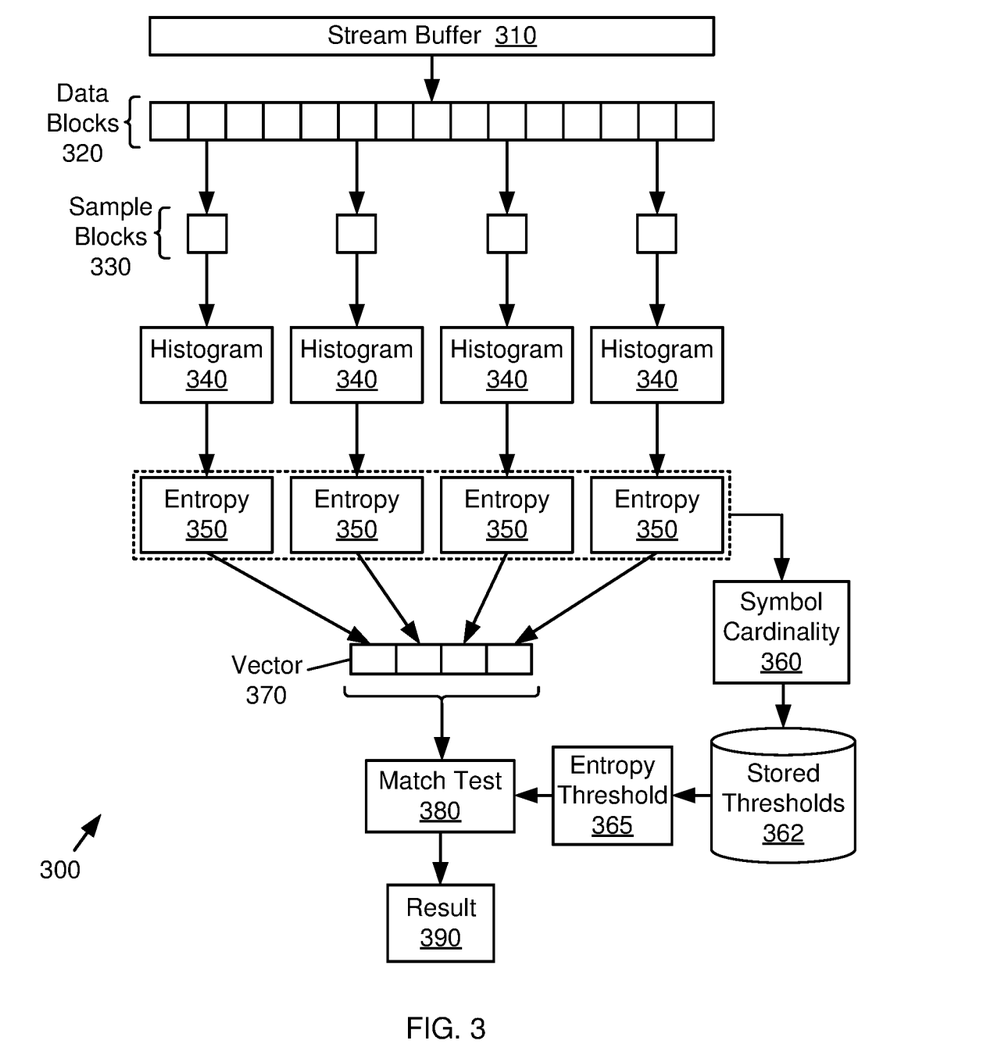
FIG. 3 is an illustration of an example operation, in accordance with some implementations.
Figure 4:
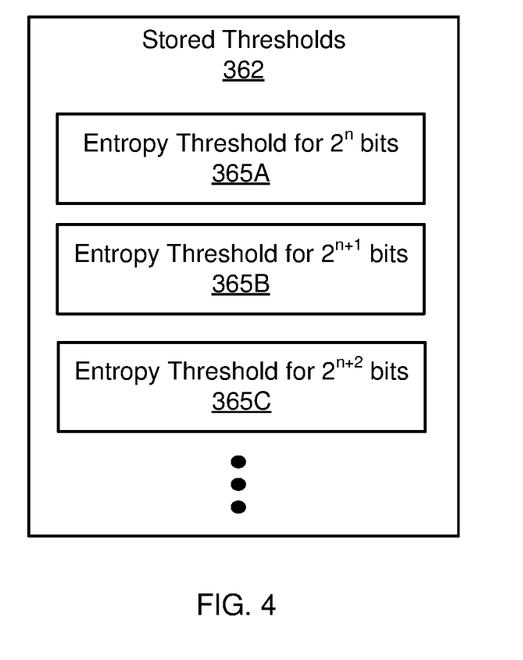
FIG. 4 is an illustration of an example data structure, in accordance with some implementations.

FIGS. 2-4—Example Process for Ransomware Detection

FIG. 2 shows an example process 200 for ransomware detection, in accordance with some implementations. In some examples, the process 200 may be performed using the controller 150 (shown in FIG. 1). The process 200 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth. For the sake of illustration, details of the process 200 may be described below with reference to FIGS. 3-4, which show some example implementations. However, other implementations are also possible.

Block 210 may include accessing a stream buffer and dividing it into multiple data blocks. Block 220 may include selecting sample blocks from the plurality of data blocks. Block 230 may include generating a histogram for each sample block. For example, referring to FIG. 3, the stream buffer 310 is divided into data blocks 320 (e.g., having equal data sizes). A subset of the data blocks 320 is selected as a set of sample blocks 330 (e.g., based on random selections of data blocks). A histogram 340 may be generated for each sample block 330. Each histogram 340 may include a predefined number of counters or "buckets" that correspond to distinct data symbols. In some implementations, the number of buckets in each histogram 340 may be a fixed number that is specified to be the largest number of different symbols that are expected to be present in the data stream. Further, the value of each bucket may represent the number of instances that the associated symbol occurs in the corresponding sample block 330. For example, each histogram 340 may include two hundred and fifty-six buckets to count the number of times that two hundred and fifty-six different characters occur in the sample block 330.

Referring again to FIG. 2, block 240 may include calculating an entropy value for each histogram. Block 250 may include generating a vector of the entropy values. For example, referring to FIG. 3, an entropy value 350 is generated for each histogram 340, and the generated entropy values 350 are grouped into the vector 370. In some implementations, each entropy value 350 may be the Shannon entropy of the corresponding histogram 340.

Referring again to FIG. 2, block 260 may include calculating symbol cardinalities of the histograms. Block 270 may include selecting a stored entropy threshold based on the symbol cardinalities. For example, referring to FIGS. 3-4, the stored thresholds 362 include multiple entropy thresholds 365A-365C (also referred to herein as "entropy thresholds 365") that correspond to different N bit encoding schemes, where N is a power of two value (e.g., N may be 16, 32, 64, 128, 256, etc.). Each entropy threshold 365 may be precalculated as the threshold entropy level that indicates, for a particular encoding scheme and a specific probability level (e.g., within 95% probability), data that is encrypted by a ransomware attack. For example, as shown in FIG. 4, the entropy threshold 365A corresponds to a $2^n$ bit encoding scheme, the entropy threshold 365B corresponds to a $2^{n+1}$ bit encoding scheme, and so forth. In some implementations, each entropy threshold 365 may be a Shannon entropy value.

The symbol cardinality 360 may be calculated as the count of the different symbols in the histograms 350. In some implementations, the symbol cardinality 360 may be the count of the different symbols present across all of the histograms 350 (e.g., based on the current set of sample blocks 330). However, other implementations are possible. For example, in other implementations, the symbol cardinality 360 may be the largest count of different symbols present in a single histogram 350, the average count of different symbols across all of the histogram 350, and so forth. In some implementations, the symbol cardinality 360 may be used to select the appropriate entropy threshold 365 from the stored thresholds 362. For example, the symbol cardinality 360 may be rounded up to the nearest power of two value, and may be matched to the corresponding entropy threshold 365.

Referring again to FIG. 2, block 280 may include performing a statistical match test between the generated entropy values and the selected entropy threshold. Decision block 290 may include determining whether there is a statistical match between the generated entropy values and the selected entropy threshold. If not, the process 200 may return to block 210 (i.e., to process new data in the stream buffer). Otherwise, if there is a statistical match between the generated entropy values and the selected entropy threshold, the process 200 may continue at block 295, including generating a ransomware alert. After block 285, the process 200 may be completed.

For example, referring to FIG. 3, a statistical match test 380 determines whether the vector 370 (including multiple entropy value 350) matches the selected entropy threshold 365 within a specified probability level (e.g., 95% probability), thereby generating the test result 390. In some implementations, the statistical match test 380 may be performed using the Student's T-test (e.g., as a one-sample test). For example, performing the Student's T-test may include computing the mean and variance of the vector 370, and computing the area under the curve of a known T-distribution corresponding to the desired confidence (probability) level. If the calculated statistic falls within the area under the curve, the Student's T-test may indicate that the statistical match exists (e.g., are similar with a 95% probability). However, in other implementations, the statistical match test 380 may use any statistical hypothesis test (e.g., the Z-test).

Figure 5:
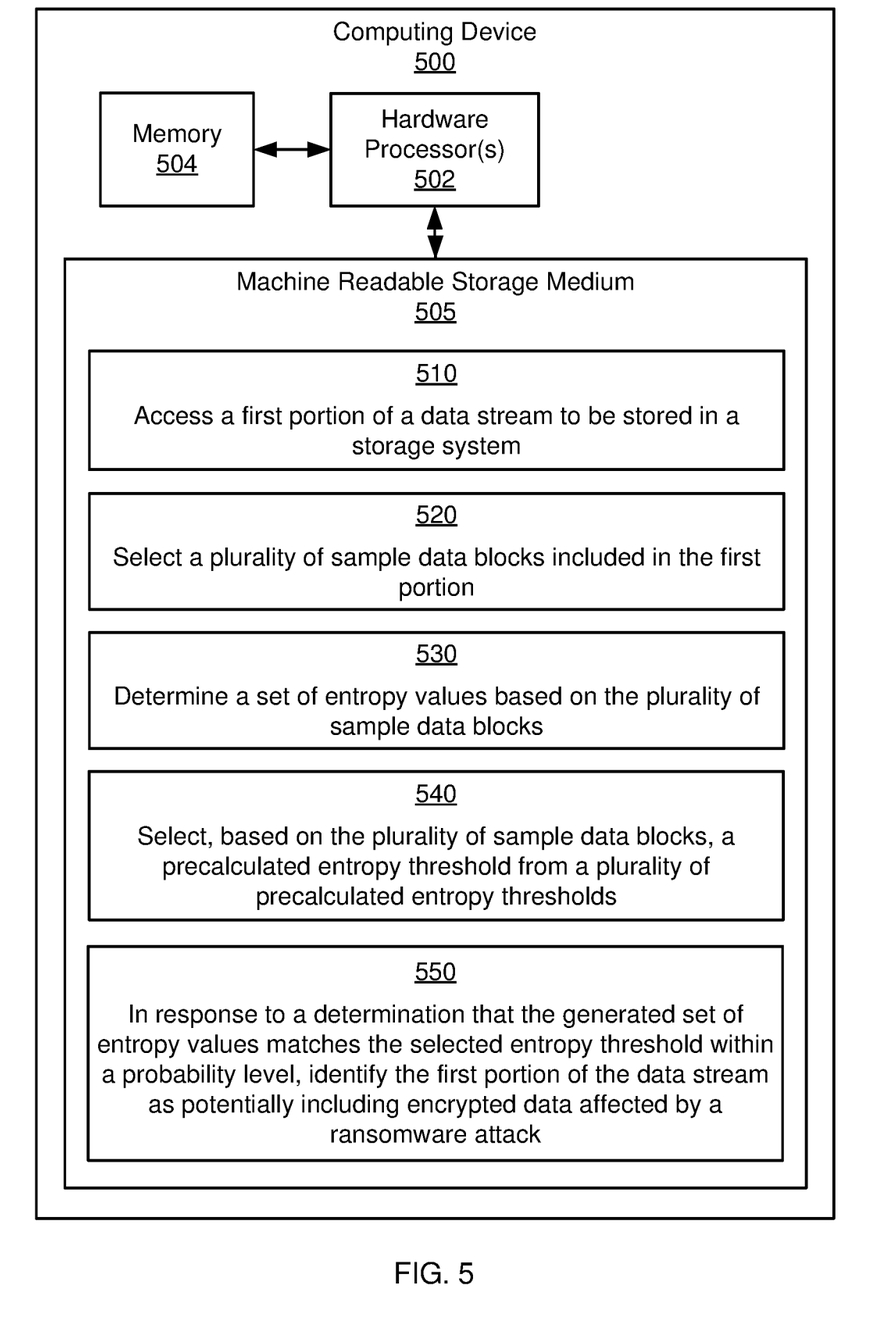
FIG. 5 is a schematic diagram of an example computing device, in accordance with some implementations.

FIG. 5—Example Computing Device

FIG. 5 shows a schematic diagram of an example computing device 500. In some examples, the computing device 500 may correspond generally to some or all of the monitor system 130 (shown in FIG. 1). As shown, the computing device 500 may include hardware processor 502 and machine-readable storage 505 including instruction 510-550. The machine-readable storage 505 may be a non-transitory medium. The instructions 510-550 may be executed by the hardware processor 502, or by a processing engine included in hardware processor 502.

Instruction 510 may be executed to access a first portion of a data stream to be stored in a storage system. Instruction 520 may be executed to select a plurality of sample data blocks included in the first portion. For example, referring to FIG. 3, the stream buffer 310 is divided into data blocks 320. A subset of the data blocks 320 is selected as a set of sample blocks 330.

Instruction 530 may be executed to determine a set of entropy values based on the plurality of sample data blocks. For example, referring to FIG. 3, a histogram 340 may be generated for each sample block 330, and an entropy value 350 is generated for each histogram 340. In some implementations, each entropy value 350 may be the Shannon entropy of the corresponding histogram 340. The generated entropy values 350 are grouped into the vector 370.

Instruction 540 may be executed to select, based on the plurality of sample data blocks, a precalculated entropy threshold from a plurality of precalculated entropy thresholds. For example, referring to FIG. 3, the symbol cardinality 360 is calculated as the count of the different symbols in the histograms 350. The symbol cardinality 360 is rounded up to the nearest power of two value, and is matched to an entropy threshold 365. The matching entropy threshold 365 is selected for comparison to the generated entropy values 350.

Instruction 550 may be executed to, in response to a determination that the generated set of entropy values matches the selected entropy threshold within a probability level, identify the first portion of the data stream as potentially including encrypted data affected by a ransomware attack. For example, referring to FIG. 3, the statistical match test 380 determines whether the vector 370 (including multiple entropy values 350) matches the selected entropy threshold 365 within a specified probability level (e.g., 95% probability). If the test result 390 indicates that the stream data is substantially random, it can be determined that the stream data has been encrypted by a ransomware attack (e.g., at the source system 110). Accordingly, in this event, a ransomware alert notification may be provided to the source system 110, and a response to the potential ransomware attack may be initiated. For example, the source system 110 may be locked or shut down, a network connection may be disconnected, defensive programs may be activated, a data recovery process may be initiated, and so forth.

Figure 6:
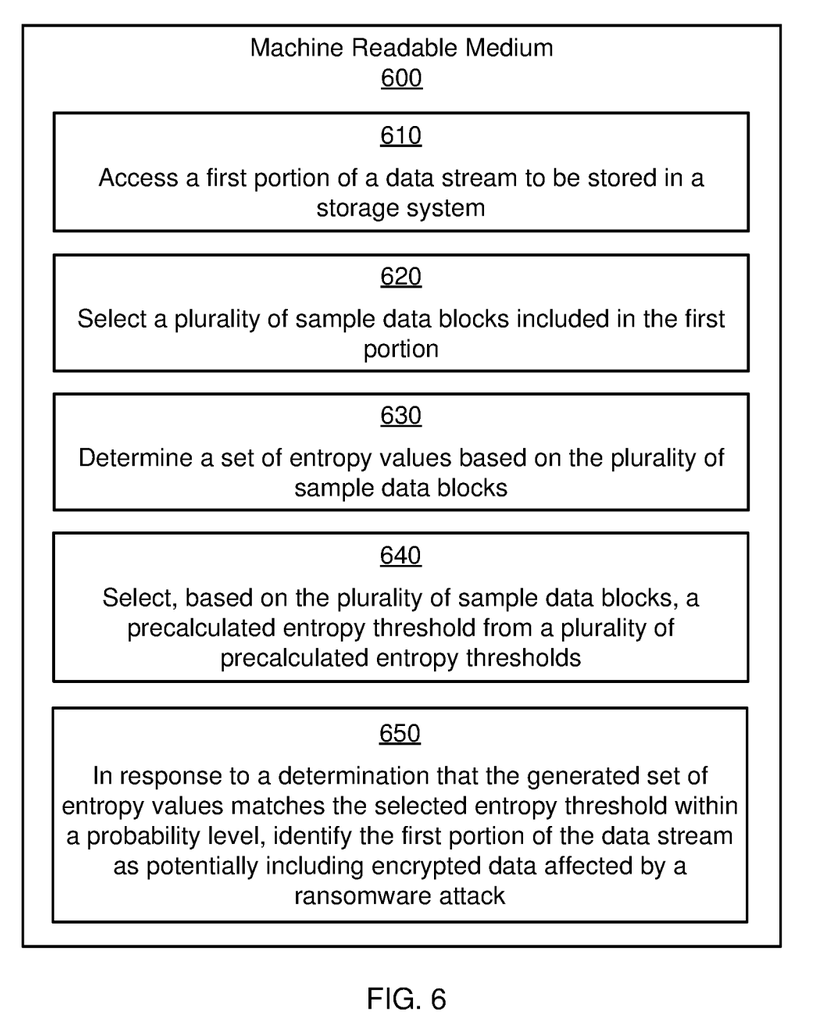
FIG. 6 is a diagram of an example machine-readable medium storing instructions in accordance with some implementations.

FIG. 6—Example Machine-Readable Medium

FIG. 6 shows a machine-readable medium 600 storing instructions 610-650, in accordance with some implementations. The instructions 610-650 can be executed by a single processor, multiple processors, a single processing engine, multiple processing engines, and so forth. The machine-readable medium 600 may be a non-transitory storage medium, such as an optical, semiconductor, or magnetic storage medium.

Instruction 610 may be executed to access a first portion of a data stream to be stored in a storage system. Instruction 620 may be executed to select a plurality of sample data blocks included in the first portion. Instruction 630 may be executed to determine a set of entropy values based on the plurality of sample data blocks. Instruction 640 may be executed to select, based on the plurality of sample data blocks, a precalculated entropy threshold from a plurality of precalculated entropy thresholds. Instruction 650 may be executed to, in response to a determination that the generated set of entropy values matches the selected entropy threshold within a probability level, identify the first portion of the data stream as potentially including encrypted data affected by a ransomware attack.

Figure 7:
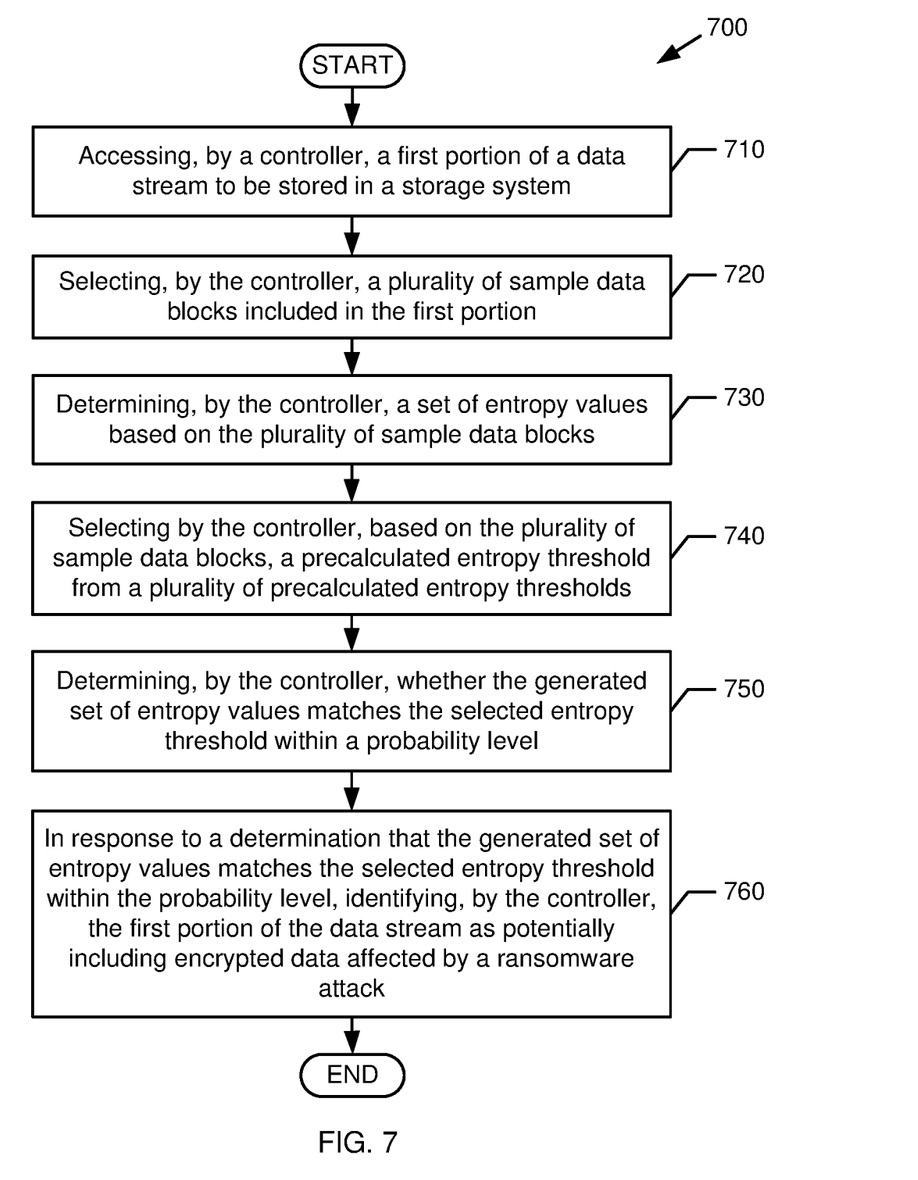
FIG. 7 is an illustration of an example process, in accordance with some implementations.

FIG. 7—Example Process

FIG. 7 shows an example process 700 for ransomware detection, in accordance with some implementations. In some examples, the process 700 may be performed using the controller 150 (shown in FIG. 1). The process 700 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth.

Block 710 may include accessing, by a controller, a first portion of a data stream to be stored in a storage system. Block 720 may include selecting, by the controller, a plurality of sample data blocks included in the first portion. Block 730 may include determining, by the controller, a set of entropy values based on the plurality of sample data blocks. Block 740 may include selecting by the controller, based on the plurality of sample data blocks, a precalculated entropy threshold from a plurality of precalculated entropy thresholds.

Block 750 may include determining, by the controller, whether the generated set of entropy values matches the selected entropy threshold within a probability level. Block 760 may include, in response to a determination that the generated set of entropy values matches the selected entropy threshold within the probability level, identifying, by the controller, the first portion of the data stream as potentially including encrypted data affected by a ransomware attack.

In accordance with some implementations described herein, a computing system may perform sampling of data entropy characteristics to detect the presence of ransomware. The computing system may capture a portion of data being transmitted to a storage device. The computing system may select sample data blocks from the data portion, and may generate an entropy value for each sample data block. Further, the computing system may select one of multiple precalculated entropy thresholds based on the sample blocks, and may determine whether the generated entropy values match the selected entropy threshold within a probability level. If so, the computing system may identify the portion of the data stream as potentially including encrypted data caused by ransomware. In this manner, the computing system may improve the performance and accuracy of ransomware detection.

Note that, while FIGS. 1-7 show various examples, implementations are not limited in this regard. For example, referring to FIG. 1, it is contemplated that the system 100 may include additional devices and/or components, fewer components, different components, different arrangements, and so forth. In another example, it is contemplated that the functionality of the controller 150 described above may be included in any another engine or software of the system 100. Other combinations and/or variations are also possible.

Data and instructions are stored in respective storage devices, which are implemented as one or multiple computer-readable or machine-readable storage media. The storage media include different forms of non-transitory memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices.

Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A computing system comprising:
a processor; and
a machine-readable storage storing instructions, the instructions executable by the processor to:
access a first portion of a data stream to be stored in a storage system;
select a plurality of sample data blocks included in the first portion;
calculate a plurality of entropy values based on the plurality of sample data blocks;
select, based on the plurality of sample data blocks, a precalculated entropy threshold from a plurality of precalculated entropy thresholds;
perform a statistical match test between the plurality of entropy values and the selected entropy threshold; and
in response to a determination that the statistical match test indicates that the plurality of entropy values matches the selected entropy threshold with a given percentage probability, identify the first portion of the data stream as including encrypted data affected by a ransomware attack.

2. The computing system of claim 1, including instructions executable by the processor to:
generate a histogram for each sample block; and
calculate an entropy value for each histogram, wherein the entropy value of each histogram is calculated as a Shannon entropy.

3. The computing system of claim 2, including instructions executable by the processor to:
calculate a symbol cardinality based on the generated histograms; and
select the entropy threshold based on the symbol cardinality.

4. The computing system of claim 3, including instructions executable by the processor to:
round up the symbol cardinality to the nearest power of two value; and
select the entropy threshold that matches the rounded-up symbol cardinality, wherein each of the plurality of precalculated entropy thresholds is associated with a different power of two value.

5. The computing system of claim 2, wherein each histogram includes a fixed number of buckets, and wherein the fixed number of buckets is specified to be the largest number of different symbols expected to be present in the data stream.

6. The computing system of claim 1, including instructions executable by the processor to:
access the first portion of the data stream from a stream buffer that stores a sliding window of the data stream during transmission to the storage system.

7. The computing system of claim 1, including instructions executable by the processor to:
generate a vector comprising the set of entropy values; and
perform the statistical match test between the generated vector and the selected entropy threshold.

8. The computing system of claim 7, wherein the statistical match test is a Student's T-test.

9. A non-transitory machine-readable medium storing instructions that upon execution cause a processor to:
access a first portion of a data stream to be stored in a storage system;
select a plurality of sample data blocks included in the first portion;
calculate a plurality of entropy values based on the plurality of sample data blocks;
select, based on the plurality of sample data blocks, a precalculated entropy threshold from a plurality of precalculated entropy thresholds;
perform a statistical match test between the plurality of entropy values and the selected entropy threshold; and
in response to a determination that the statistical match test indicates that the plurality of entropy values matches the selected entropy threshold with a given percentage probability, identify the first portion of the data stream as including encrypted data affected by a ransomware attack.

10. The non-transitory machine-readable medium of claim 9, including instructions that upon execution cause the processor to:
generate a histogram for each sample block; and
calculate an entropy value for each histogram, wherein the entropy value of each histogram is calculated as a Shannon entropy.

11. The non-transitory machine-readable medium of claim 10, including instructions that upon execution cause the processor to:
calculate a symbol cardinality based on the generated histograms; and
select the entropy threshold based on the symbol cardinality.

12. The non-transitory machine-readable medium of claim 11, including instructions that upon execution cause the processor to:
round up the symbol cardinality to the nearest power of two value; and
select the entropy threshold that matches the rounded-up symbol cardinality, wherein each of the plurality of precalculated entropy thresholds is associated with a different power of two value.

13. The non-transitory machine-readable medium of claim 10, wherein each histogram includes a fixed number of buckets, and wherein the fixed number of buckets is specified to be the largest number of different symbols expected to be present in the data stream.

14. The non-transitory machine-readable medium of claim 9, including instructions that upon execution cause the processor to:
access the first portion of the data stream from a stream buffer that stores a sliding window of the data stream during transmission to the storage system.

15. The non-transitory machine-readable medium of claim 9, including instructions that upon execution cause the processor to:
generate a vector comprising the set of entropy values; and
perform the statistical match test between the generated vector and the selected entropy threshold, wherein the statistical match test is a Student's T-test.

16. A method comprising:
accessing, by a controller, a first portion of a data stream to be stored in a storage system;
selecting, by the controller, a plurality of sample data blocks included in the first portion;
calculating, by the controller, a plurality of entropy values based on the plurality of sample data blocks;
selecting by the controller, based on the plurality of sample data blocks, a precalculated entropy threshold from a plurality of precalculated entropy thresholds;
performing, by the controller, a statistical match test between the plurality of entropy values and the selected entropy threshold; and
in response to a determination that the statistical match test indicates that the plurality of entropy values matches the selected entropy threshold with a given percentage probability, identifying, by the controller, the first portion of the data stream as including encrypted data affected by a ransomware attack.

17. The method of claim 16, comprising:
generating a histogram for each sample block; and
calculating an entropy value for each histogram, wherein the entropy value of each histogram is calculated as a Shannon entropy.

18. The method of claim 17, comprising:
calculating a symbol cardinality based on the generated histograms;
rounding up the symbol cardinality to the nearest power of two value; and
selecting the entropy threshold that matches the rounded-up symbol cardinality, wherein each of the plurality of precalculated entropy thresholds is associated with a different power of two value.

19. The method of claim 16, comprising:
accessing the first portion of the data stream from a stream buffer that stores a sliding window of the data stream during transmission to the storage system.

20. The method of claim 16, comprising:
generating a vector comprising the set of entropy values; and
performing the statistical match test between the generated vector and the selected entropy threshold, wherein the statistical match test is a Student's T-test.

* * * * *